United States Patent [19]
Townsend

[11] Patent Number: 5,165,732
[45] Date of Patent: Nov. 24, 1992

[54] GAS APPLIANCE CONNECTION

[75] Inventor: Donald M. Townsend, Mill Valley, Calif.

[73] Assignee: Simpson Dura Vent Company, Inc., San Leandro, Calif.

[21] Appl. No.: 681,152

[22] Filed: Apr. 5, 1991

[51] Int. Cl.⁵ .............................................. F16L 27/00
[52] U.S. Cl. ................................ 285/226; 126/307 R; 285/903; 454/903
[58] Field of Search ............... 126/307 R, 307 A, 315, 126/312, 82, 389; 98/60, DIG. 7; 110/184, 160; 285/226, 903, 153, 154, 138; 138/121, 122; 237/46-49; 34/232, 233, 235, 86, 140

[56] References Cited

U.S. PATENT DOCUMENTS

| | | | |
|---|---|---|---|
| 3,730,073 | 5/1973 | Potter | 98/60 |
| 3,740,930 | 6/1973 | Cullom | 98/60 |
| 3,743,328 | 7/1973 | Longfellow | 285/226 |
| 3,838,732 | 10/1974 | Overmyer | 454/63 |
| 3,865,146 | 2/1975 | Meserole | 138/122 |
| 3,970,334 | 7/1976 | Campbell | 285/226 |
| 4,187,833 | 2/1980 | Zahora et al. | 126/307 A |
| 4,214,380 | 7/1980 | Meyer | 34/235 |
| 4,306,491 | 12/1981 | Reardon, Jr. | 98/60 |
| 4,385,623 | 5/1983 | Jacklicn | 126/307 R |
| 4,608,963 | 9/1986 | Townsend et al. | 126/307 R |
| 4,768,444 | 9/1988 | DeWerth et al. | 126/307 R |
| 4,846,147 | 7/1989 | Townsend et al. | 98/60 |
| 4,852,616 | 8/1989 | Holcomb | 138/121 |
| 5,020,512 | 6/1991 | Vago et al. | 126/364 |
| 5,042,172 | 8/1991 | Folo et al. | 34/235 |

FOREIGN PATENT DOCUMENTS

| | | | |
|---|---|---|---|
| 70340 | 9/1912 | Fed. Rep. of Germany | 126/82 |
| 797229 | 6/1958 | United Kingdom | 126/315 |

OTHER PUBLICATIONS

Brochure by Simpson Dura Vent Co., Inc. "Because There Simply Is No Comparison!" & Put an End to the Single Wall Blues.

*Primary Examiner*—Eric K. Nicholson
*Attorney, Agent, or Firm*—James R. Cypher

[57] ABSTRACT

A combination of metallurgical and vent engineering design solutions that result in a superior product, lower installed cost, and corrosion-free performance for venting modern fan-assisted gas appliances by using a flexible, compressible, corrugated gas vent connector. Preferably the connector is constructed from a material having a heat conductivity substantially equal to or greater than aluminum. Other forms of the invention include the use of stainless steel; a double wall corrugated wall in the flex section; and the use of flat flex in the corrugated section.

By providing the flex connector with twist lock couplings the connector may be assembled in the field more quickly with a greater assurance of its integrity under adverse conditions such as earthquakes or other building moving conditions.

11 Claims, 7 Drawing Sheets

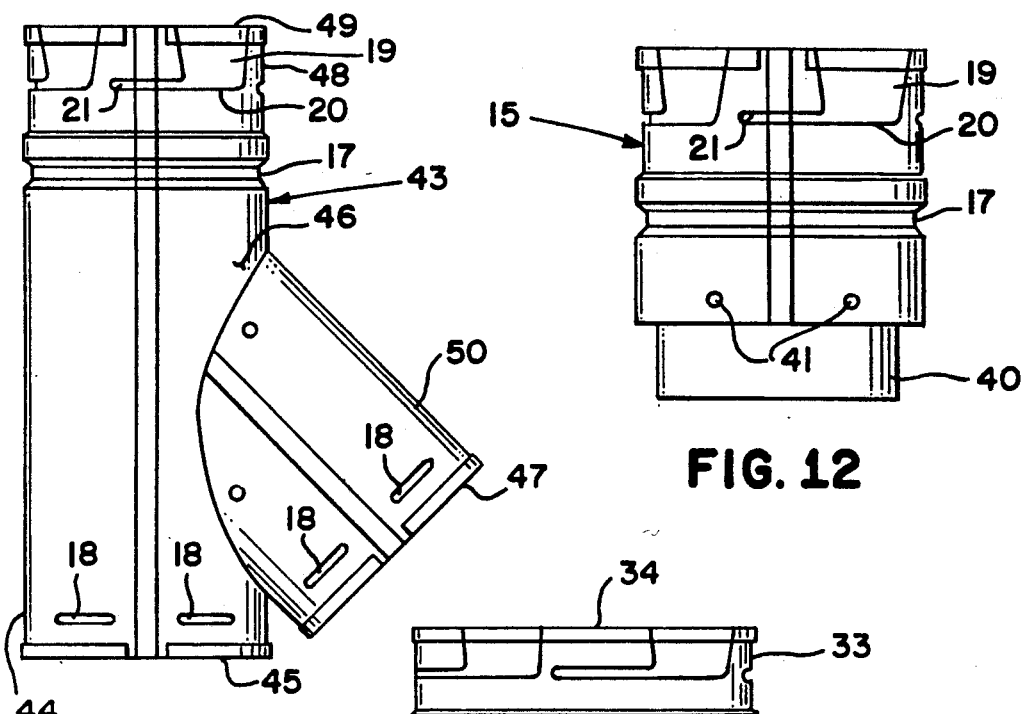
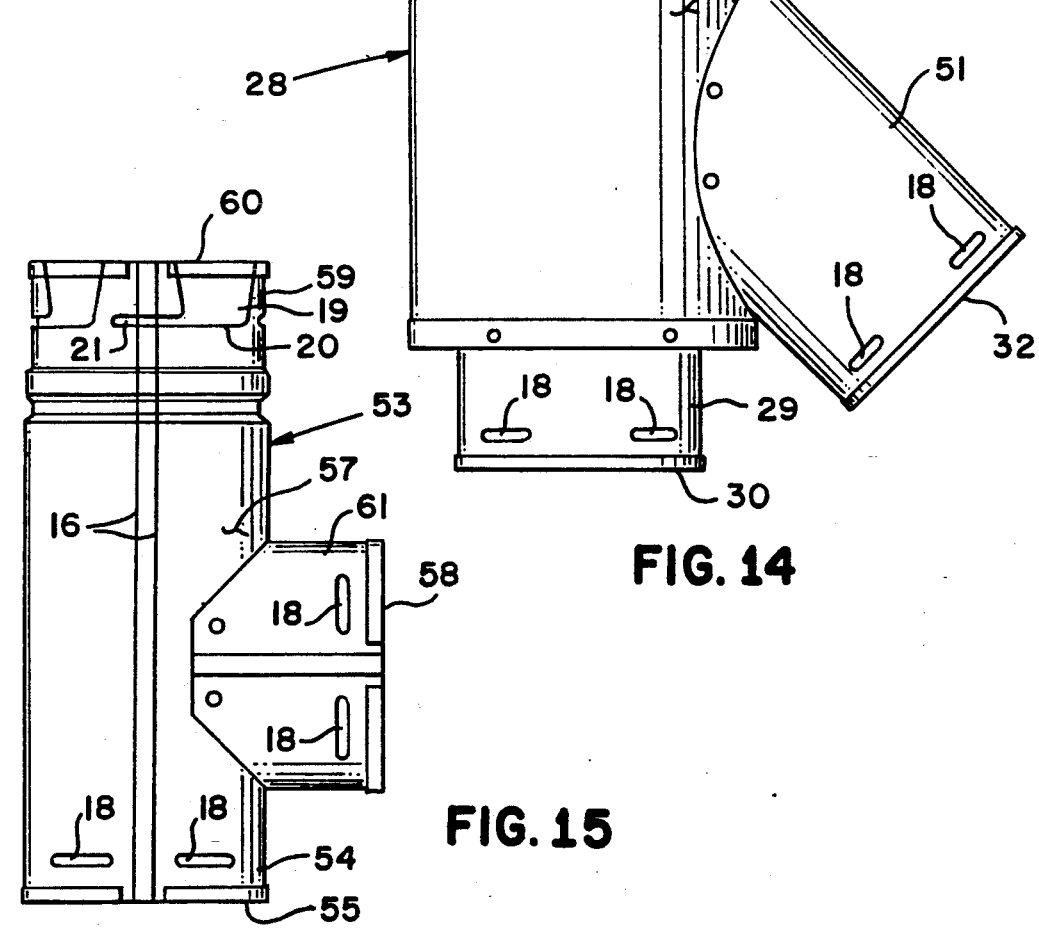

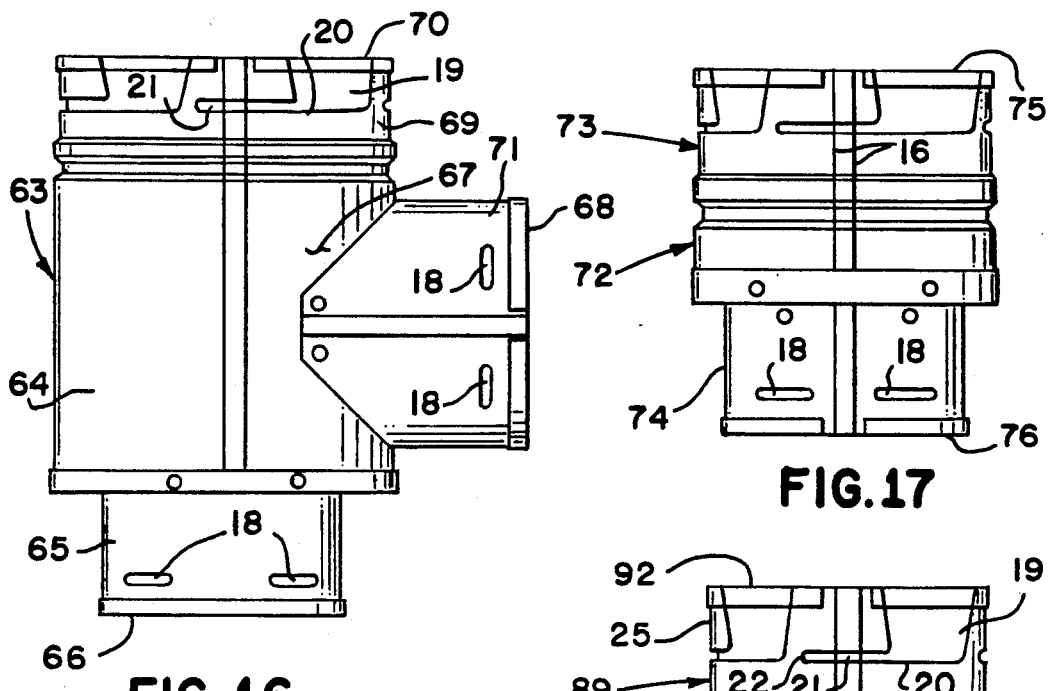
FIG. 16
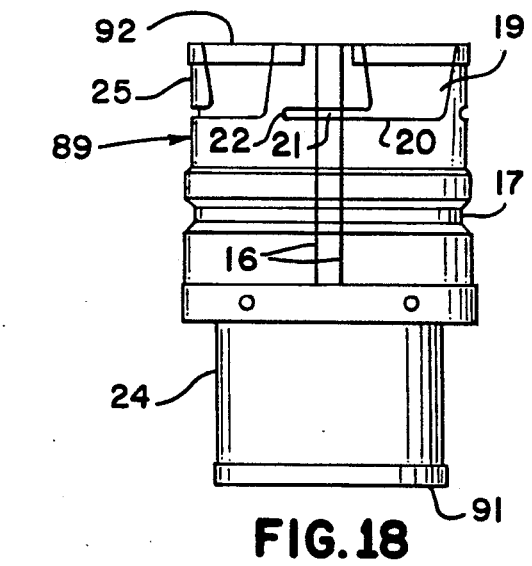
FIG. 17
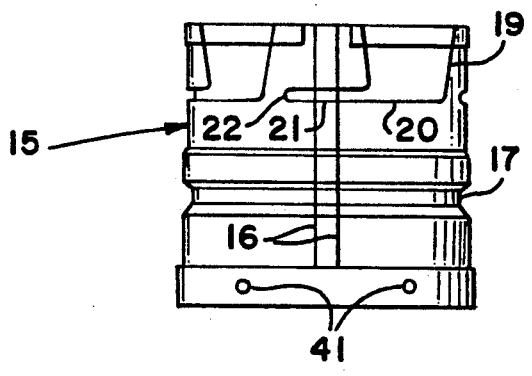
FIG. 18
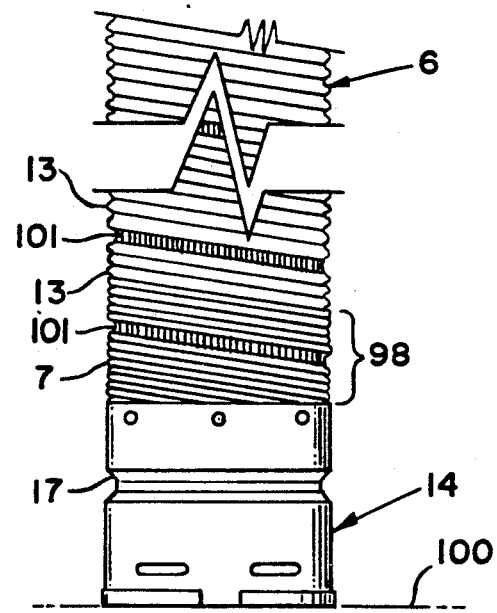
FIG. 20
FIG. 19

GAS APPLIANCE CONNECTION

BACKGROUND

Gas appliances such as furnaces and hot water heaters require a connection between appliance and a vent pipe to conduct combustion products including noxious gasses and water vapor to the atmosphere.

The prior art connection includes straight sections of smooth wall pipe including elbows to make the required turns between the discharge opening in the gas appliance and the ceiling or wall vent. Because of the infinite varieties of distances between the gas appliance and the vent as well as the infinite positions with respect to the gas appliances and the vent, it has been the prior art practice for journeymen sheet metal workers to install elbows on the gas appliance and the vent and then to cut a straight length of pipe to fit between the elbows. The elbows and straight length of pipe are connected to one another by crimping one end of the pipe and elbows, forcing the parts together and securing them by at least three stainless steel screws at each joinder.

The process of selecting elbows with the correct angle and measuring and cutting the straight length of pipe plus crimping the ends of the elbows and straight section of pipe is tedious, time consuming and often unsightly.

In earthquake country, such connections are relatively hazardous since substantial relative movement between the gas appliance and the vent can cause the rigid connection to twist and bend which at the least will cause partial collapse of the pipes and at worst, actual separation of one or more of the joints.

With the advent of thermally efficient gas appliances a new problem has surfaced in the industry which supplies gas appliance connections; viz., there is a substantial increase in condensation occurring in the connector and serious corrosion problems have arisen. To make the corrosion problem even worse, the flue gasses from these high efficiency furnaces are loaded with chlorine ions which are hygroscopic in nature (affinity for water). The higher concentration of acid in the vent connector makes them particularly vulnerable to that type of corrosion that pits the metal thereby quickly forming holes through the metal. Condensation, if permitted to repeatedly stay in contact with the inner wall of the conduit for any appreciable amount of time will result in rusting and pitting of a metal connector.

SUMMARY OF THE INVENTION

The gist of the present invention is the use of a flexible, compressible, corrugated gas vent connector for connecting gas appliances to an outside vent.

An object of the present invention is to provide a connection which is more economical to install, is more durable, and aesthetically pleasing than prior art straight pipe connections.

A further object is to provide a connection for gas appliances which is less subject to corrosion, uses less parts, and can be easily installed by apprentices or do-it-yourselfers.

Still another object is to provide a gas appliance connection which is less subject to buckling and separation from the appliances when subject to earthquake conditions.

A still further object is to provide a connection which eliminates the need for and the time consuming procedure of connecting each part of the connection by stainless steel screws.

Another object is to provide a flexible member which may be shortened by compression to eliminate the labor cost of job site cutting of pipe members.

A specific object is to provide a vent connection for venting modern fan-assisted gas appliances which will reduce the amount of condensate by 25% to 50% as well as condensate wet times with no reduction in BTU capacity.

BRIEF DESCRIPTION OF THE DRAWINGS

FIG. 12 is an enlarged side view of a male twist lock fitting which may be attached to the flexible, compressible, corrugated gas vent connector of the present invention.

FIG. 13 is an enlarged side view of a standard "Y" member used to connect two flexible, compressible, corrugated gas vent connectors of the present invention to a B-Vent.

FIG. 14 is an enlarged side view of a reduction "Y" member which may be used in connecting two flexible, compressible, corrugated gas vent connectors of the present invention to a B-Vent.

FIG. 15 is an enlarged side view of a Tee member which may be used in joining one or two flexible, compressible, corrugated gas vent connectors of the present invention to a B-Vent.

FIG. 16 is an enlarged side view of a reduction Tee member which may be used in joining one or two flexible, compressible, corrugated gas vent connectors of the present invention to a B-Vent.

FIG. 17 is an enlarged side view of a an increaser member which may be used in connecting a small diameter flexible, compressible, corrugated gas vent connector of the present invention to a larger diameter connector.

FIG. 18 is an enlarged side view of an appliance fitting which may be used in joining the flexible, compressible, corrugated gas vent connector of the present invention to a gas appliance such as a furnace.

FIG. 19 is an enlarged elevation view of a male fitting which is joined to the end of the flexible connector of the present invention.

FIG. 20 is a side elevation view of a portion of the connector of the present invention illustrated in FIG. 6 taken generally in the direction of line 20—20 with a portion longitudinally compressed so as to shorten the connector.

DESCRIPTION OF THE PREFERRED EMBODIMENTS

Figure 1:
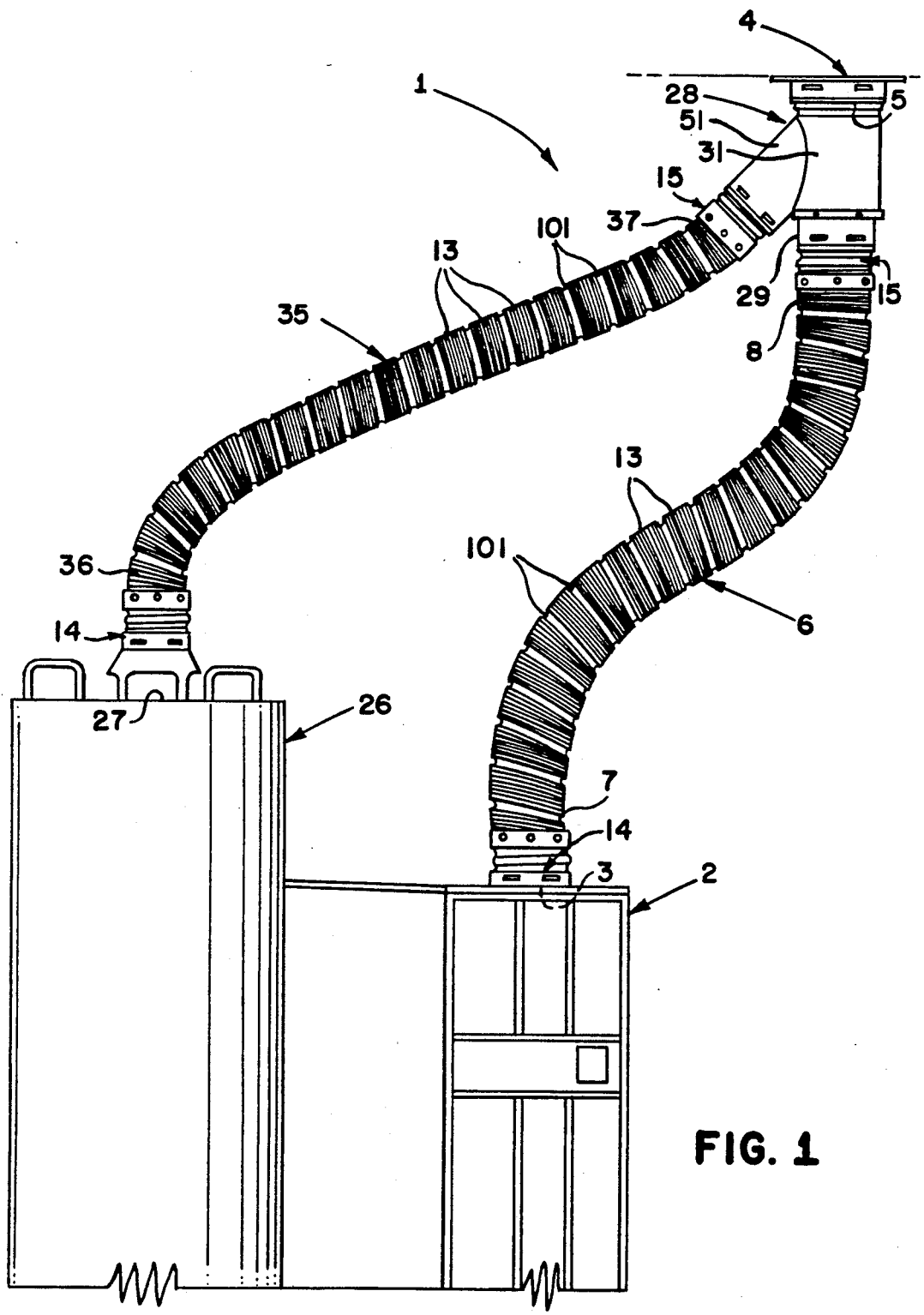
FIG. 1. illustrates the connection of the present invention using the flexible, compressible, corrugated gas vent connector of the present invention showing a typical installation of a furnace and a hot water heater attached to a double wall B-Vent in the ceiling.

The connection 1 of the present invention for a gas appliance 2 having a gas discharge opening 3 and a vent 4 having a gas inlet opening 5 which includes: a flexible, longitudinally compressible, corrugated gas vent connector 6 having a corrugated portion 13 and a first end 7 and connected to the gas appliance discharge opening 3 and a second end 8 and connected to the gas inlet opening 5 of the vent 4.

Figure 6:
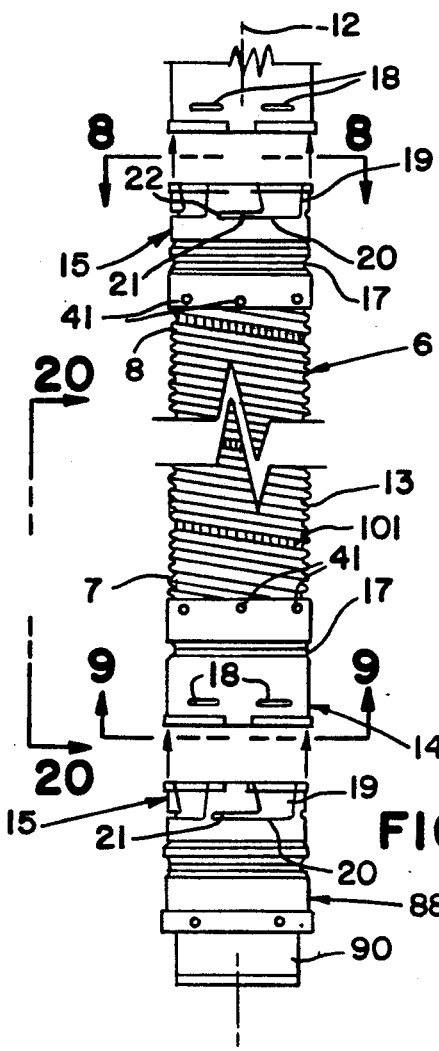
FIG. 6 is an exploded enlarged view of the flexible, compressible, corrugated gas vent connector of the present invention just prior to twist lock connection to a B-Vent connector and an appliance fitting.
Figure 7:
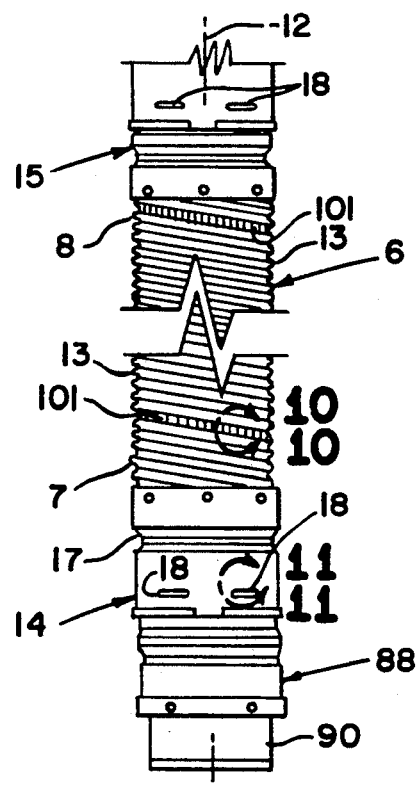
FIG. 7 is view of the flexible, compressible, corrugated gas vent connector of the present invention with the elements illustrated in FIG. 6 joined together in a twist lock connection.
Figure 10:
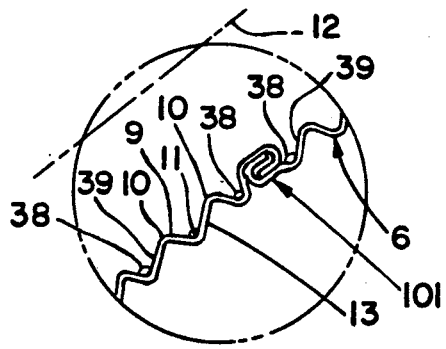
FIG. 10 is an enlarged cross sectional view of a portion of the connector illustrated in FIG. 7 taken generally in the vicinity of line 10—10.

The corrugated portion 13 of connector 6 is formed with a corrugated inside wall 9 formed with a plurality of aligned repeating ridges 10 and valleys 11 oriented generally laterally to the longitudinal axis 12 of the connector 6. The corrugated portion 13 is constructed from a plurality of spiral strips in a well known manner which are joined in a manner illustrated in FIG. 10 and indicated by the number 101. The longitudinal axis 12 of connector 6 is shown in FIGS. 6, 7 and 10. It is to be understood that the longitudinal axis curves as the connector itself is bent to the selected position.

Preferably, the connector 6 is constructed from a material having a heat conductivity substantially equal to or greater than aluminum. The material may be metal such as aluminum, or stainless steel or plastic so long as it is capable of holding generally the same length and shape in either the compressed or non-compressed state.

A preferred material for construction of the corrugated portion 13 is aluminum. As an example, the corrugated portion 13 may be made from 3003 grade 0.0122" thick aluminum manganese alloy coil and H14 Temper (annealing treatment). This material complies with National Fuel Gas Code minimum wall thickness for vent connectors.

Another material which may also be used in constructing the corrugated portion is stainless steel known by the commercial designation as AL 29 4C.

To facilitate installation of the connection, preferably first end 7 of the flexible, compressible, corrugated gas vent connector 6 is connected to female twist lock fitting 14, and the second end 8 of the flexible, compressible, corrugated gas vent connector 6 is connected to a male twist lock fitting 15.

The male twist lock fitting 15 is illustrated e.g. in FIGS. 6, 8, 12 and 19, No specific claim is made to the fitting 15 per se since it is a non-patented item manufactured by Applicant's Assignee in which the same basic structure is used in twist lock chimney liners. The structure and operation are therefor only very briefly described.

Figure 8:
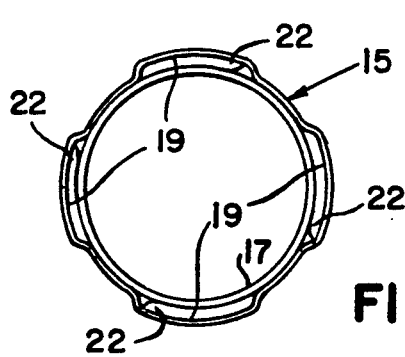
FIG. 8 is an end view of the connector illustrated in FIG. 6 taken along line 8—8.
Figure 9:
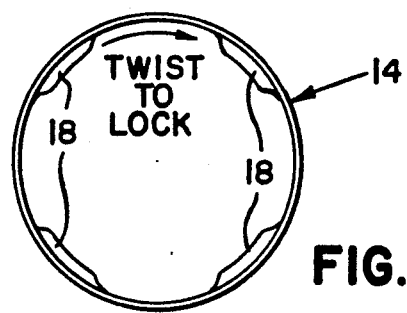
FIG. 9 is an end view of the connector illustrated in FIG. 6 taken along line 9—9.
Figure 11:
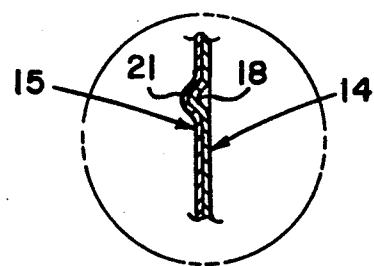
FIG. 11 an enlarged cross sectional view of a portion of the connector illustrated in FIG. 7 taken generally in the vicinity of line 11—11.

The male twist lock fitting 15 is made from G90 aluminized steel sheet 0.18" thick formed in a cylinder and joined at vertical lines 16. An annular indentation 17 is formed to provide a stop for the end of the corrugated portion 13. Rivets 41 connect the fitting 15 to corrugated portion 13. Referring to FIGS. 6, 8 and 9, four inwardly protruding dimples 18 on female fitting 14 are dimensioned to slide axially within outwardly protruding channels 19. When male fitting 15 is inserted into female fitting 14 until dimples 18 strike edge 20, the entire connector must be rotated so that dimples 18 move into annular channel 21 until they reach the end of channel 22. Once dimples 18 move to end 22 of annular channel 21, the male and female fittings cannot be separated unless the reverse procedure is followed. The twist lock fitting just described eliminates the need for joining end fittings together by means of stainless steel screws.

Referring to FIGS. 18, an appliance fitting 89 is illustrated for joining the connector 6 to a gas appliance such as a furnace. Furnace appliance fitting 89 has a first end 24 dimensioned and formed for connection to a gas appliance such as furnace 2 and a second end 25 having a male twist lock fitting similar to the fitting illustrated in FIGS. 6 and 8 formed and dimensioned for interlocking connection to the female twist lock fitting on the second end 8 of the flexible, compressible, corrugated gas vent connector 6 illustrated in FIGS. 6 and 9.

Major advantages over the prior art connection are realized when at least two gas appliances are connected to a vent as illustrated in FIG. 1. As shown in FIG. 1, a typical furnace 2 and a hot water heater 26 are connected to B-Vent 4. Hot water heater 26 is formed with a discharge opening 27 through which the hot gasses are expelled.

A junction member such as a reduction "Y" member 28 illustrated in FIG. 14 is provided having a first end 29 and inlet opening 30 dimensioned for connection to the second end 8 of the flexible, compressible, corrugated gas vent connector 6 and a mid portion 31 having a mid portion end 51 formed with a gas inlet opening 32, and a second end 33 having a discharge opening 34 connected to the gas inlet opening 5 of the vent 4. A second flexible, longitudinally compressible, corrugated gas vent connector 35 having a first end 36 is connected to the second gas appliance 26 having a discharge opening 27 and a second end 37 is connected to the gas inlet opening 32 of the mid portion end 51 of the reduction "Y" member 28. Female ends 29 and 51 are formed with dimples 18 as previously described. In the reduction "Y" illustrated in FIG. 14, the diameter of the discharge opening 30 is considerably smaller than the discharge opening 34.

In response to the severe corrosion problems encountered with the introduction of mid efficiency (Category III, 83-90% AFUE) furnaces in the early 1980's the Gas Research Institute, in co-operation with Battelle Laboratories, developed new sizing tables for vents and vent connectors. The Gas Research Institute's answer to the corrosion problem was to develop new sizing tables to minimize the amount of condensate as a means of reducing corrosion in vents and vent connectors.

The new sizing tables also requires that in many instances, single -wall galvanized connectors be replaced with Type B gas vent. As a result, the cost of a typical vent connector system for a combination hot water heater and fan assisted furnace increased from a dealer cost of $27.65 to $108.39, and a list price to the consumer of $212.00. This price increase often eliminates the prior initial cost advantage of gas over electric heat pumps.

In addition, some furnace manufacturers have lowered their appliance efficiency into the Category I "near condensing" range of 78% to 83% AFUE. Despite a dramatic reduction in corrosion problems experienced in the field, there continues to be concern that the Category I appliances may result in excessive corrosion of vent connectors.

Instead of merely changing the diameter of the vent connector to reduce corrosion in the vent connector, or reducing the efficiency of the furnace, the present application provides an entirely new approach.

The present application presents a method of reducing corrosion in a connection 1 between the gas discharge opening 3 in a mid (category I 78% to 83% AFUE) gas appliance 2 and the gas inlet opening 5 of a vent 4 by locating the inlet opening 5 of the vent 4 above the the gas discharge opening 3 of the gas appliance 2; and selecting a length of connector conduit 6 of corrugated structure presenting a plurality of repeating valleys 11 and ridges 9 oriented transversely to the longitudinal axis 12 of the connector conduit 6 preferably having a heat coefficient equal to or greater than that of aluminum.

Incredibly, the instant method has resulted in a minimum 25% to 50% reduction in the amount of condensate, as well as condensate wet times, with no reduction in BTU capacity.

To understand the problem and the unobvious method claimed in this application it is important to understand some of the background of the problem and the metallurgical phenomenon known as pitting corrosion which occurs in galvanized steel connectors.

Category I (78% to 83% AFUE) fan-assisted furnaces differ from draft-hood equipped appliances in that fan-assisted appliances have a higher potential for condensate to form in the vent connection due to the lack of dilution air.

The response by the furnace manufacturers to the problems of high condensation generation and resultant increase in corrosion was to lower their appliance efficiency into the Category I "near condensing range of 78% to 83% AFUE. Despite a dramatic reduction in corrosion problems experienced in the field, there continues to be concern that the Category I appliances may result in excessive corrosion of vent connectors.

As stated above, the other solution to the corrosion problem was to change the diameter of the vent connector. While changing the diameter of the connector helps the corrosion problem and also avoids positive vent pressures and flue gas spillage, it may exacerbate the problem of meeting clearance requirements from combustible portions of the building structure.

Based on field experience that indicated severe pitting corrosion in the horizontal galvanized vent connectors, with only minor corrosion, of a more uniform, general nature in vertical Type B gas vents, the industry decided to establish a more restrictive "wet time" for horizontal vent connectors of 3 minutes 50 seconds, as compared to 12 minutes for vertical Type B gas vents and 12 minutes for aluminum corrugated chimney liners.

The decision to restrict wet times in vent connectors also reflected the belief that, due to the hygroscopic nature of chlorine ions (affinity for water), the pitting attack of galvanized vent connectors may be due to the chlorine ions "washing out" in the vent connector condensate, thus resulting in a higher concentration of acid in the vent connector and resultant pitting erosion, as opposed to the vertical Type B gas vent.

It is well known that aluminum tends to corrode in a uniform or general overall surface corrosion. Aluminum's corrosion resistance, in fact, is attributable to the formation of an aluminum oxide "corrosion" layer which serves as a barrier between the base material and the corrosive agents. The white oxide protective coating is very stable and tight adhering, tends to build-up in thickness over time, and provides a protective coating that resists further corrosion.

In contrast, galvanized steel has a substantially lower resistance to corrosive attack, entirely dependent on the sacrificial zinc coating for its protection, and ultimately, the total wall thickness of the base metal. When galvanized materials are subjected to a corrosive medium, especially a chloride environment, corrosion typically proceeds to initiate pitting. Upon reaching the base metal, the pitting phenomenon is arrested while the "sacrificial" zinc coating is attacked. Once this zinc coating adjacent to the pit is consumed, the pitting proceeds in an ever increasing rate of penetration. The pitting phenomenon is explained in "*Corrosion Engineering*" by Fontana & Greene as follows:

Pitting is one of the most destructive and insidious forms of corrosion. Pitting is particularly vicious because it is a localized and intense form of corrosion, and failures often occur with extreme suddenness."

Pits usually grow in the direction of gravity. Most pits develop and grow downward from horizontal surfaces. Lesser numbers start on vertical surfaces, and only rarely do pits grow upward from the bottom of horizontal surfaces. Once started, a pit penetrates the metal at an ever-increasing rate."

The more rapid pitting attack of vent connectors might be explained by the theory that, due to the hygroscopic nature of the chlorine ion (affinity for water), the chlorine rapidly precipitates out of the flue gas vapor at the first opportunity. As a result, the condensate in the vent connector might be more highly acidic and thus explain the rapid corrosive attack of vent connectors. In response to this theory, it is essential to avoid condensation in the vent connector and to minimize "wet time".

By selecting a flexible, longitudinally compressible, corrugated gas vent connector 6, applicant achieves vent runs which are direct and as short as possible with maximum lateral slope. The flex material eliminates the need for both 45 degree elbows (0.35 fitting loss coefficient) and 90 degree elbows (0.75 fitting loss coefficient). As a result, offset lateral runs may now be accommodated with less restrictive, gradual "sweep" bends that reduce vent pressurization and avoid spillage.

As previously stated, horizontal runs in standard smooth wall connectors are to be avoided to reduce corrosion by pitting. Yet, the selection of a corrugated vent pipe in the present application actually avoids creating flat horizontal surfaces, even when the corrugated vent pipe runs in a horizontal direction due to the fact that the highest percentage of the surface remains in a steeply inclined orientation.

Another fallacy about the selection of corrugated flex was that the increased "roughness" would result in poor draft, vent pressurization and spillage (back pressure). This problem turned out to be "no problem", as the vent connector runs tend to be short, and a a point in the system where flue gases are the hottest and therefor have maximum venting "power" or lift. Further, the use of corrugated flex pipe eliminated the use of elbows, and in most cases tees, which in themselves result in increased back pressure.

Finally, it well known that aluminum has a high coefficient of heat transfer and since it cools faster than galvanized steel one would think that aluminum would result in more condensation and longer wet time. This has surprisingly been found not to be true in combination with corrugated flex for the following reasons.

Actually, the higher thermal conductivity of the aluminum vent material in combination with the corrugated flex turns out to have a very powerful and positive effect. As the furnace cycles on, the aluminum vent material quickly climbs in temperature. This presents the thin layer of condensate with a hotter surface, and thus more rapidly drys up the condensate resulting in a shorter "wet time". Also, since a corrugated surface presents a much larger surface area than a smooth wall connector, the condensate itself is initially spread out over a greater area thereby reducing the thickness of the water condensate layer. A thinner water layer evaporates much more quickly than a thick layer of water, thereby reaching the metal which then heats up very quickly since no BTU's are required to cause further evaporation. As confirmed by tests, this results in a minimum reduction of 25% to 50% in the amount of condensate (oz/sq.ft) and a minimum 25% to 50% reduction in condensate "wet times".

Referring to FIG. 10, it may be seen that condensate tends to collect in the valleys 11 as water droplets 38 and one would think that this would be harmful. Instead, it has been found that as the water collects in the valleys 11, the steep valley sides 39 tend to drain faster, becoming dry and permitting faster heat build up on the steep sides. Because of the high conductivity of aluminum, the valleys become heated by conduction and boil off the accumulated condensate.

Another problem with smooth wall connections which was alleviated by corrugated vent pipes was the tendency of condensate to flow back down into the appliance causing corrosion of the appliance itself. In an inclined smooth wall vent connection, condensate forms on the cool metal as fine droplets. As these droplets grow larger, gravity overcomes the surface tension effect which tends to hold the droplets in place and the condensate starts to run downward. As the condensate runs downward, it picks up more condensate into a virtual stream, "washing" down the metal smooth wall conduit and into the appliance.

In contrast, in a corrugated wall connector as illustrated in FIG. 10, the condensate flows down the steep side wall 39, but then it is caught in the valley 11 where it is momentarily trapped. As set forth above, the steep walls heat up, conduct heat to the valley and boil off the condensate in droplet 11 before it has an opportunity to tumble over the "mini-dam" in each corrugation ridge 9. Thus, running of condensate back into the gas appliance is reduced.

The connection of the present invention may be as simple as a single piece of corrugated flex connector 6 connecting a furnace or water heater with a vent 4. In most installations, however, the connection will consist of elements as illustrated in FIGS. 12-18.

Referring to FIG. 14, a male twist lock fitting 15 is shown which is identical to the fitting illustrated in FIGS. 6 and 8. An extension 40 illustrated in FIG. 12 fits into the flexible corrugated connector 6 and is fastened with rivets 41. All other parts of fitting 15 were previously described.

Fitting 14 is connected to flexible corrugated connector 6 by rivets 41 and is dimensioned to receive male fitting 15 therein. Fitting 14 is further formed with an indented groove 17 which serves as a stop for the end of flexible corrugated connector 6. As set forth above, dimples 18 in the form of rectangular inwardly formed indents are formed in the metal wall and are formed and dimensioned to slide into channels 19 in male fitting 15 and lock with annular channel 21.

FIG. 13 illustrates a standard "Y" 43 having a first end 44 and inlet opening 45 dimensioned for connection to the second end 8 of the flexible, compressible, corrugated gas vent connector 6 and a mid portion 46 having a gas inlet opening 47, and a second end 48 having a discharge opening 49 connected to the gas inlet opening 5 of the vent 4. A second flexible, longitudinally compressible, corrugated gas vent connector 35 having a first end 36 is connected to the second gas appliance 26 discharge opening 27 and a second end 37 is connected to the gas inlet opening 47 of the mid portion 46 of the standard "Y" member 43. Female ends 44 and 50 are formed with dimples 18 as previously described. Second end 48 which is a male end is configured similarly to male twist lock fitting 15 as illustrated in FIG. 12.

Figure 4:
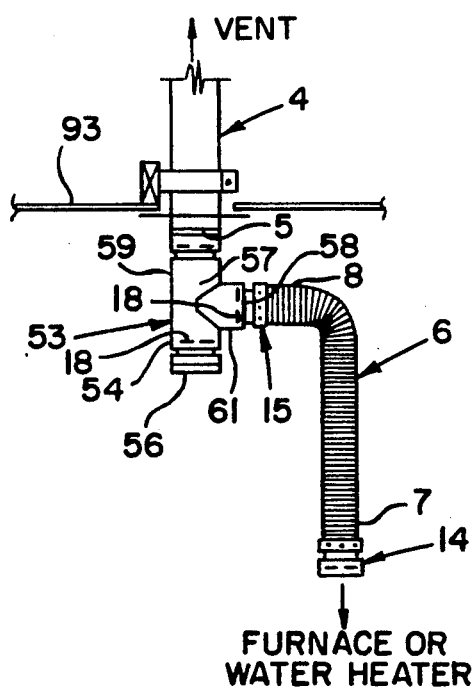
FIG. 4 is an elevation view of the connection of the present invention in a typical Tee Type application of the flexible, compressible, corrugated gas vent connector of the present invention connected to a furnace or a hot water heater and to a ceiling B-Vent using a tee connector.

FIG. 15 illustrates a standard tee 53 which is also shown in FIG. 4. Tee 53 is formed with a first end 54 and inlet opening 55 dimensioned for connection to the second end of a flexible, compressible, corrugated gas vent connector or it may be capped as shown in FIG. 4 with a tee cap 56. Tee 53 also is formed with a mid portion 57 having a gas inlet opening 58, and a second end 59 having a discharge opening 60 connected to the gas inlet opening 5 of the vent 4. A flexible, longitudinally compressible, corrugated gas vent connector 6 having a first end 7 is connected to a gas appliance discharge opening and a second end 8 is connected to the gas inlet opening 58 of the mid portion 57 of the standard tee member 53. Female ends 54 and 61 are formed with dimples 18 as previously described. Second end 59 which is a male end is configured similarly to male twist lock fitting 15 as illustrated in FIG. 12.

FIG. 16 illustrates a reduction tee 63 which is formed with a first end 64, reduced section 65 and inlet opening 66 dimensioned for connection to the second end of a flexible, compressible, corrugated gas vent connector or it may be capped with a tee cap similar to tee 56 cap illustrated in FIG. 4. Tee 63 also is formed with a mid portion 67 having a gas inlet opening 68, and a second end 69 having a discharge opening 70 connected to the gas inlet opening of a vent such as vent 4 in FIG. 2. A first flexible, longitudinally compressible, corrugated gas vent connector such as connector 6 illustrated in FIG. 4 having a first end 7 is connected to a gas appliance discharge opening and a second end 8 is connected to the gas inlet opening 68 of the mid portion 67 of the reduction tee member 63. Female ends 65 and 71 are formed with dimples 18 as previously described. Second end 69 which is a male end is configured similarly to male twist lock fitting 15 as illustrated in FIG. 12.

FIG. 17 is a flex connection increaser 72 having a male end fitting 73 which is larger in diameter than the female end fitting 74. The male end fitting 73 is similar in design to the male end fitting 15 previously described and illustrated in FIGS. 6, 8, and 12 e.g. and is formed with a discharge opening 75. The female end fitting 74 is similar in design to the female end fitting 14 in FIGS. 6, 9, and 7 and is formed with an inlet opening 76.

Before describing the method of installation of the connection of the present invention, reference is made to the method of installing vent connections under the prior art. Referring to FIGS. 21A, 21B, and 21C, workman "W" must first inspect the double wall B-Vent in the ceiling for fit and 6" clearance from combustibles. Next, he will normally select a Tee, crimp the end, fit it and then fasten the tee to the B-Vent with stainless steel screws. If conditions do not permit, the workman will then add an elbow 77 or single wall pipe length by crimping the end fitting so he can get 1" of clearance at the double wall B-Vent in the ceiling and 6" clearance with the single wall product and fasten it with stainless steel screws and repeat the process by adding a length of smooth wall vent pipe 78. A tee 79 is then selected, the end crimped and fitted and then shoved into the vent pipe 78. The stainless steel screws are usually not inserted at the joints until the entire assembly is fitted since a mistake in measurements or guessing at the angles and location of the Tee could cause the workman to have to tear everything out, place the pieces in the scrap heap and start all over again. An elbow 80 is then positioned on the discharge opening 3 of furnace 2 and rotated to an approximate angle. The distance between the elbow 80 and inlet opening 81 of tee 79 is then measured. A length of smooth wall pipe is then selected, measured, and cut to length. The pipe end is then crimped, fit, and re-crimped until the pipe 82 fits together with elbow 80 and Tee 79. If pipe 82 does not fit, it must either be cut to fit, but if too short, pipe 82 must be discarded and a new pipe cut to fit. If the crimped end still shows, it means there is a bad fit and a new pipe 82 should be measured and cut. After the fit looks good, both ends of pipe 82 must be shoved into the elbow 80 and Tee 79 respectively.

The next step is to fit an elbow 83 to the discharge opening 27 of hot water heater 26 and then rotate it to the approximate angle in the direction of Tee 79. An elbow 85 is shoved into the opening in Tee 79 and rotated to the appreximate direction of elbow 83 on hot water heater 26. The distance from the elbow 83 to the tee 79 is then measured by measuring tape 86, a smooth wall pipe selected of the approximate length, measured and cut to the measured length. The end of pipe 84 is then crimped and shoved into elbow 83 and elbow 85. Finally, three stainless steel screws must be used to attach each joint. The workmen must deal with the whole assembly possibly falling apart before he can get all the screws in and insuring that he does not collapse the pipe, particularly the crimped portions, while he is inserting the screws. Usually a screw gun is used and some screws, because of obstructions, will be difficult to set. Depending upon his level of skill and luck, a journeyman sheetmetal workman may take 20 to 30 minutes to accomplish the foregoing procedure. A week end do-it-yourselfer, would take much longer Assembly of the connection of the present invention is far easier and quicker. An installation as shown in FIG. 1 is typically a 2 to 3 minute job for an apprentice workman. Installation is as follows. If required, Appliance fitting 88 is attached to discharge opening 27 on water heater 26 and furnace fitting 89 is attached to furnace 2. A reduction "Y" 28, a standard "Y" 43, or a Tee 53 is then attached to ceiling B-Vent 4.

The workman then selects a flexible corrugated connector 6 of approximately the desired length between the hot water heater 26 and the "Y" member 28. If the length is too short, a longer standard length is selected, or an additional short length is twist locked together. If the length is too long, the workman simply shortens flexible corrugated connector 6 by placing the female end 14 against the floor, grasping the corrugated flex connector 6 about 1 foot from the end, and pushing toward the floor 100 to accordion the corrugated flex connector 6. A length of flexible corrugated connector 6 which has been shortened by compression is illustrated in FIG. 20. The shortened area is indicated by the numbered bracket 98. This procedure can shorten the corrugated flex connector 6 up to 4 inches for every foot of length. The procedure is repeated until the corrugated flex connector reaches the desired length. Male fitting 15 on corrugated flex connector 35 is twist locked to the "Y" member 28 and the other end 36 is connected to the hot water heater 26. To attach a corrugated flex connector 6 to the furnace the procedure is simply repeated. Where permitted by code, the flex connector simply is inserted into an opening in a masonry chimney which may or may not be outfitted with a metal liner.

An optional appliance fitting 88 illustrated in FIG. 6 may be connected to the hot water heater 26 as stated above. This fitting is formed with an extension 90 which is connected to male end member 15 as illustrated in FIG. 19.

An optional furnace fitting 89 as illustrated in FIG. 18 having inlet opening 81 and outlet opening 92 may be attached to furnace 2.

Figure 2:
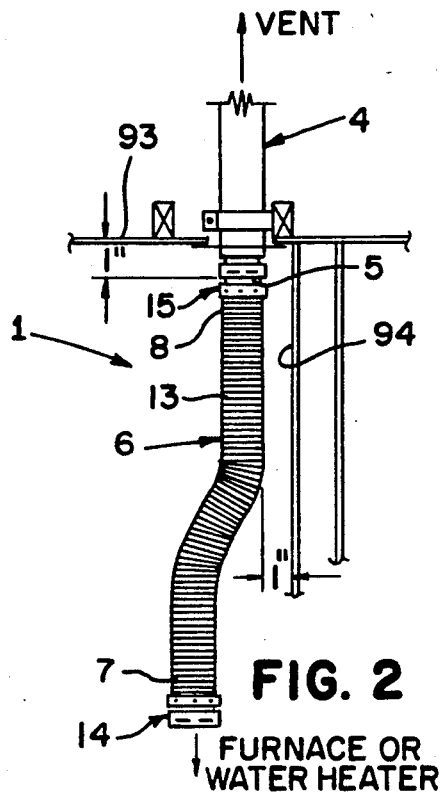
FIG. 2 illustrates the connection of the present invention in an elevation view of a typical single gas appliance installation of the flexible, compressible, corrugated gas vent connector of the present invention connected to a furnace or hot water heater and to a double wall B-Vent in the ceiling.

The connection of the present invention may be located within one inch of combustibles. As illustrated in FIG. 2, connector 6 may be located within 1 inch of combustible materials in ceiling 93 and wall 94.

Figure 3:
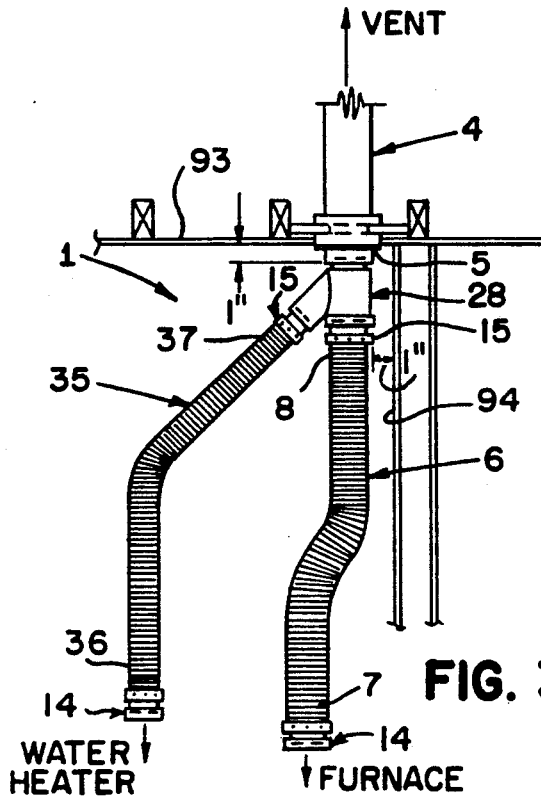
FIG. 3 illustrates an elevation view of the connection of the present invention in a typical multiple gas appliance installation of the flexible, compressible, corrugated gas vent connector of the present invention connected to a furnace and a hot water heater and to a ceiling B-Vent using a reduction "Y" connector.

FIG. 3 again illustrates an installation in which a reduction "Y" 28 is included in the system so that a flex corrugated connector 35 may be connected to a water heater, and a flex corrugated connector 6 may be connected to a furnace with a 1" clearance from the combustibles in ceiling 93 and combustibles in wall 94.

Figure 5:
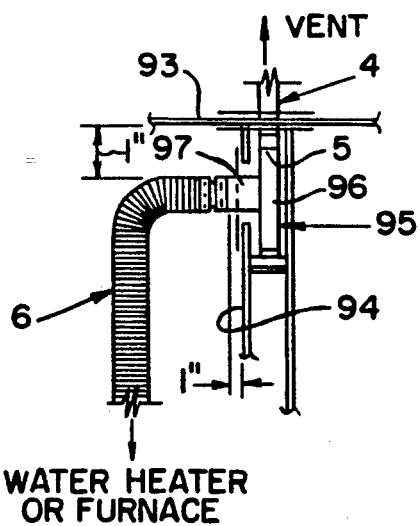
FIG. 5 is an elevation view of the connection of the present invention in an oval vent application of the flexible, compressible, corrugated gas vent connector of the present invention connected to a furnace or a hot water heater and to a ceiling B-Vent using an oval tee connector.

FIG. 5 illustrates that the connection of the present invention may be used with many different gas appliances and vents. In this case, flex corrugated connector 6 is attached to a tee member having an obround body with a round inlet opening 97 for twist lock connection to a male fitting 15 on flex corrugated connector 6. Again, the connection need only clear the combustible wall 94 and ceiling 93 by an inch.

Figure 21:
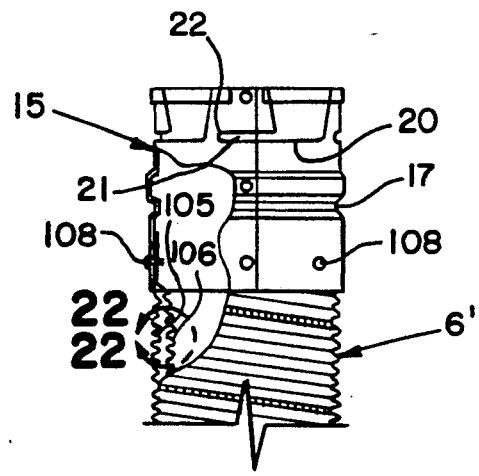
FIG. 21 is a side view partially in cross section of a another form of the invention and includes a male twist lock fitting attached to a double wall corrugated section.
Figure 22:
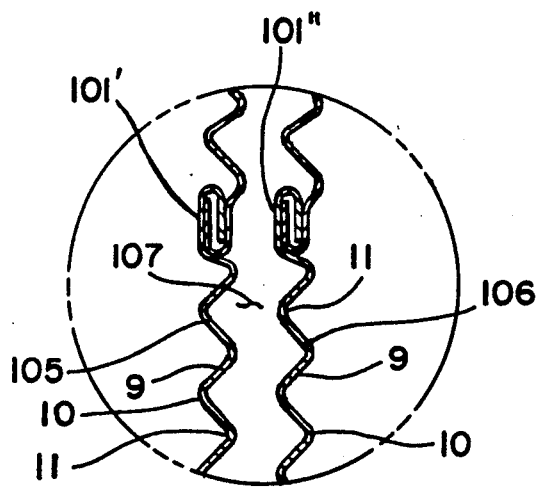
FIG. 22 is a cross sectional view of a portion of the double wall corrugated section taken generally along lines 22—22 in FIG. 21.

Referring to FIGS. 21 and 22, another form of the invention is illustrated. Instead of a single wall corrugated section as illustrated in FIGS. 6 and 10, the flexible longitudinally compressible corrugated gas vent connector 6', may be formed with two corrugated walls 105 and 106 with an air space 107 therebetween. Both corrugated walls 105 and 106 may be connected by rivets 108 to male twist lock fitting 15 which is identical to fitting 15 illustrated in FIG. 6 and previously described. The corrugated walls are constructed of the same materials and configuration as previously described with portions of the spiral corrugations connected as before at crimped connections 101' and 101".

Figure 23:
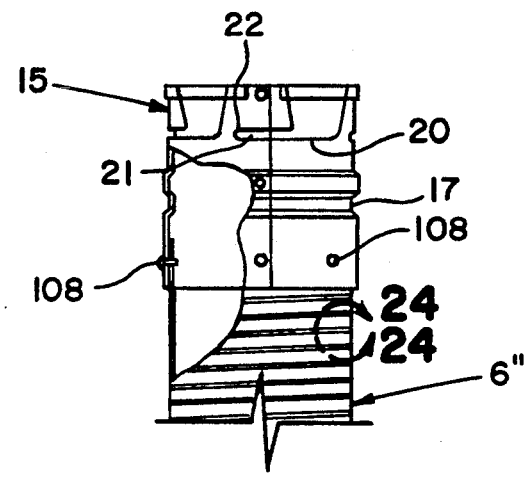
FIG. 23 is a side view partially in cross section of still another form of the invention and includes a male twist lock fitting connected to a flat corrugated section.
Figure 24:
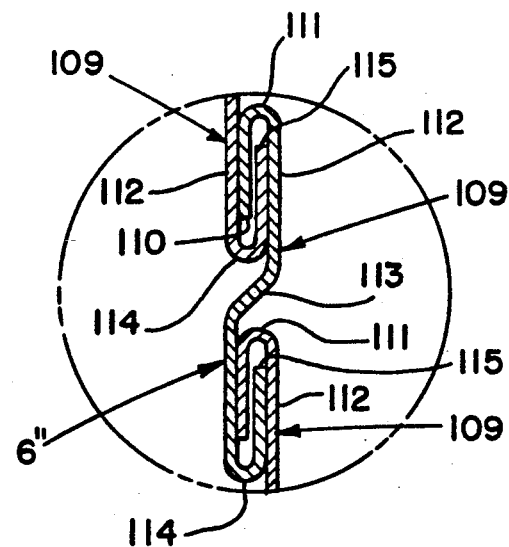
FIG. 24 is a cross sectional view of a portion of the flat corrugated section illustrated in FIG. 23 and taken generally along lines 24—24 of FIG. 23.
Figure 25A:
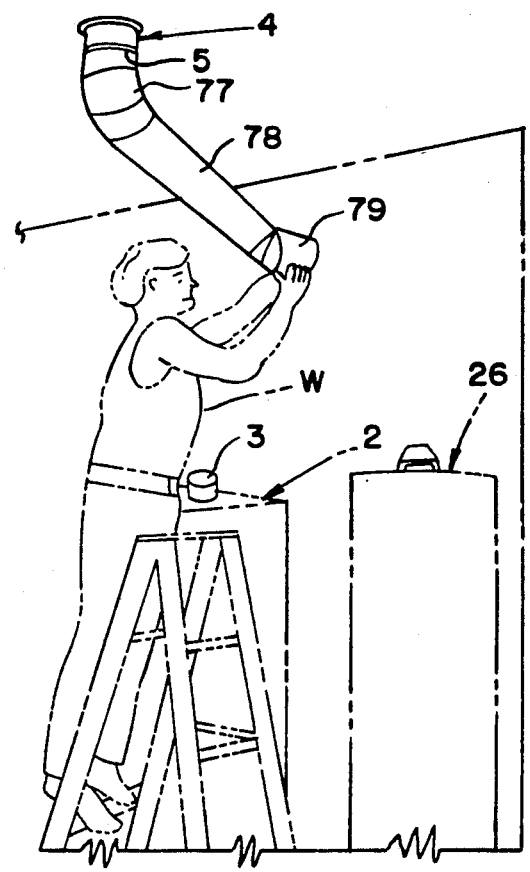
FIG. 25A is an illustration of a prior art connection being assembled by a workman.
Figure 25C:
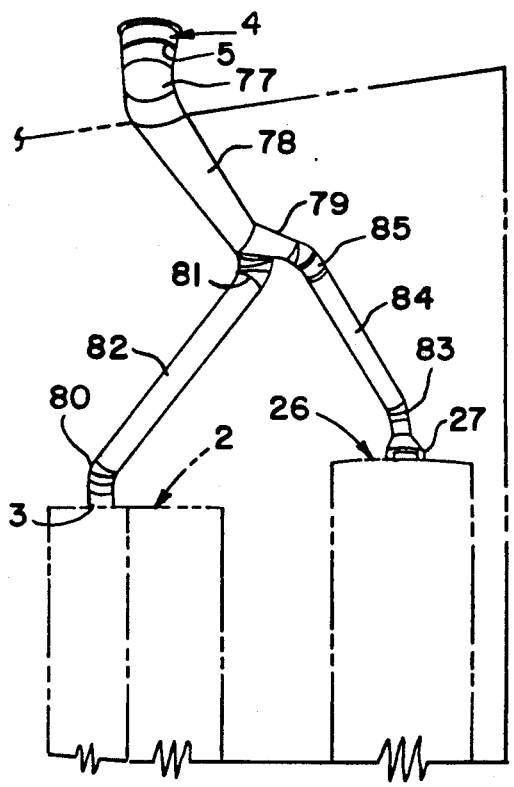
FIG. 25C is an illustration of a prior art connection for venting flue gasses from a hot water heater and a furnace.
Figure 25B:
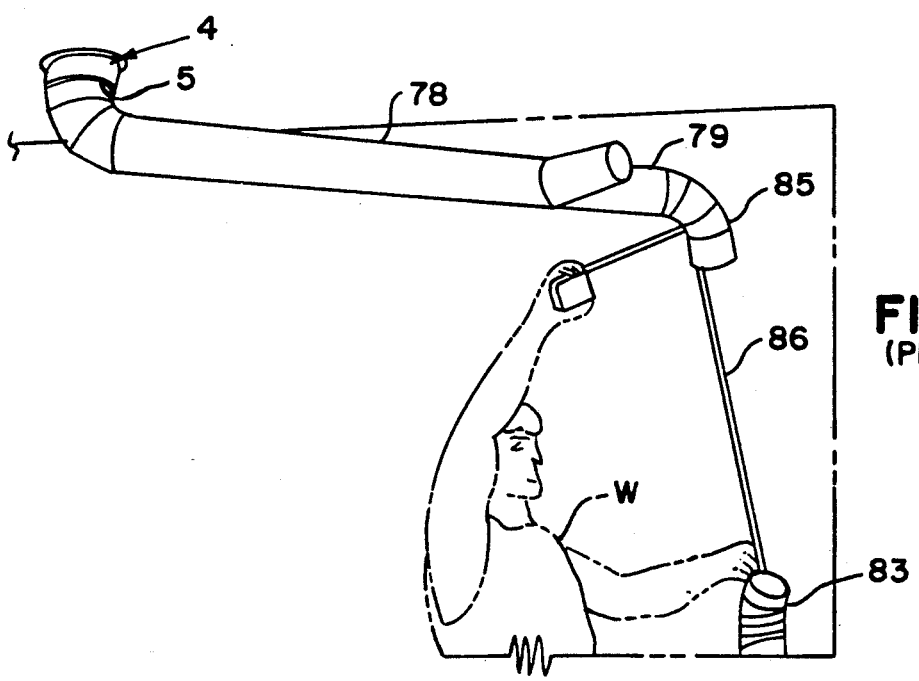
FIG. 25B is an illustration of a portion of a prior art connection being measured in preparation for cutting a proper length straight vent pipe section.

Still another form of the invention is illustrated in FIGS. 23 and 24 in which the flexible longitudinally compressible corrugated gas vent connector 6" is constructed from a flat flex structure. While wall area is decreased due to the absence of ridges 10 and valleys of the corrugated wall illustrated in FIG. 22, longitudinal compressibility is retained. As illustrated in FIG. 24, the walls are made up of a plurality of sections 109 having a first straight end 110, a first curved section 111, an elongated section 112 with an offset portion 113, a second curved portion 114, and a second straight end portion 115.

The flat flex wall 6" is connected by rivets 108 to male twist lock fitting 15 which is identical to fitting 15 illustrated in FIG. 6 and previously described. The corrugated walls are constructed of the same materials as previously described.

I claim:

1. A connection for use with a gas appliance which burns gas and produces combustion gases and water moisture and having a gas discharge opening and for use with a vent having a gas inlet opening comprising:
   a. a flexible, longitudinally compressible, corrugated gas vent connector having a corrugated portion having a first end connected to said gas appliance discharge opening and a second end connected to said gas inlet opening of said vent;
   b. said corrugated portion having an inside wall formed with a plurality of aligned repeating ridges and valleys oriented generally laterally to the longitudinal axis of said connector and over the entire cross section; and
   c. said corrugated portion of said connector being constructed from a material having a heat conductivity substantially equal to or greater than aluminum.

2. A connection as described in claim 1 wherein:
   a. said gas vent connector is constructed from metal.

3. A connection as described in claim 2 wherein:
   a. said gas vent connector is constructed from aluminum.

4. A connection as described in claim 1 comprising:
   a. said first end of said flexible, compressible, corrugated gas vent connector is formed with a female twist lock fitting; and
   b. said second end of said flexible, compressible, corrugated gas vent connector is formed with a male twist lock fitting.

5. A connection for a gas appliance having a gas discharge opening and a vent having a gas inlet opening comprising:
   a. a flexible, longitudinally compressible, corrugated gas vent connector having a corrugated portion and a first end connected to said corrugated portion and said gas appliance discharge opening and a second end connected to said corrugated portion and said gas inlet opening of said vent;
   b. said connector being formed with a corrugated inside wall formed with a plurality of aligned repeating ridges and valleys oriented generally laterally to the longitudinal axis of said connector;
   c. said corrugated portion of said connector being constructed from a material having a heat conductivity substantially equal to or greater than aluminum;
   d. said first end of said flexible, compressible, corrugated gas vent connector is formed with a female twist lock fitting;
   e. said second end of said flexible, compressible, corrugated gas vent connector is formed with a male twist lock fitting;
   f. an adapter having a first end connected to said gas appliance and a second end having a male twist lock fitting formed and dimensioned for interlocking connection to said female twist lock fitting on said second end of said flexible, compressible, corrugated gas vent connector.

6. A connection for use with first and second gas appliances both of which burn gas and produce combustion gases and water moisture and each has a gas discharge opening and for use with a vent having a gas inlet opening comprising:
   a. a first flexible, longitudinally compressible, corrugated gas vent connector having a corrugated portion having a first end connected to said first gas appliance discharge opening and a second end;
   b. said corrugated portion of said first connector having an inside wall formed with a plurality of aligned repeating ridges and valleys oriented generally laterally to the longitudinal axis of said first connector;
   c. said corrugated portion of said first connector being constructed from a material having a heat conductivity substantially equal to or greater than aluminum;
   d. a junction member having a first end having an inlet opening dimensioned for connection to said second end of said first flexible, compressible, corrugated gas vent connector, a mid portion having a gas inlet opening, and a second end having a discharge opening connected to said gas inlet opening of said vent, and;
   e. a second flexible, longitudinally compressible, corrugated gas vent connector having a first end connected to said second gas appliance discharge opening and a second end connected to said gas inlet opening of said mid portion of said junction member.

7. A connection for use with a gas appliance which burns gas and produces combustion gases and water moisture and having a gas discharge opening and for use with a vent having a gas inlet opening comprising:
   a. a flexible, longitudinally compressible, corrugated gas vent connector having a double wall corrugated portion having a first end connected to said gas appliance discharge opening and a second end connected to said gas inlet opening of said vent;
   b. each of said double walls of said corrugated portion of said connector being formed with a plurality of aligned repeating ridges and valleys oriented generally laterally to the longitudinal axis of said connector;
   c. said inner and outer walls of said double wall corrugated portion of said connector being separated by an air space; and
   d. said inner wall of said corrugated portion of said connector being constructed from a material having a heat conductivity substantially equal to or greater than aluminum and being corrugated over the entire cross section.

8. A connection for a gas appliance as described in claim 7 wherein:
   a. said corrugated gas vent connector is made from aluminum.

9. A connection for a gas appliance as described in claim 7 wherein:
   a. said corrugated gas vent connector is made from stainless steel.

10. A connection for a gas appliance as described in claim 8 wherein:
    a. said corrugated portion is constructed from a flat flex structure.

11. A connection for a gas appliance as described in claim 9 wherein:
    a. said corrugated portion is constructed from a flat flex structure.

* * * * *